(12) United States Patent
Zhang et al.

(10) Patent No.: US 6,775,240 B1
(45) Date of Patent: Aug. 10, 2004

(54) SYSTEM AND METHODS FOR MEASURING QUALITY OF COMMUNICATIONS OVER PACKET NETWORKS

(75) Inventors: Peng Zhang, Buffalo Grove, IL (US); Tzuoh-Ying Su, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 654 days.

(21) Appl. No.: 09/650,060

(22) Filed: Aug. 29, 2000

Related U.S. Application Data

(60) Provisional application No. 60/155,317, filed on Sep. 21, 1999.

(51) Int. Cl.[7] .............................................. G01R 31/08
(52) U.S. Cl. ..................... 370/251; 370/248; 379/22.01; 379/22.02; 379/27.03
(58) Field of Search .......................... 379/22.01, 22.02, 379/27.02, 27.03, 27.04; 370/248, 249, 250, 251, 252

(56) References Cited

U.S. PATENT DOCUMENTS

| | | | |
|---|---|---|---|
| 2,618,686 A | * 11/1952 | De Lange | |
| 3,842,247 A | * 10/1974 | Anderson | |
| 3,920,973 A | * 11/1975 | Avellar et al. | |
| 5,784,406 A | * 7/1998 | DeJaco et al. | 375/224 |
| 5,784,558 A | * 7/1998 | Emerson et al. | 709/230 |
| 6,169,763 B1 | * 1/2001 | Woodward et al. | 375/224 |
| 6,370,120 B1 | * 4/2002 | Hardy | 370/252 |
| 6,389,111 B1 | * 5/2002 | Hollier et al. | 379/28 |
| 6,445,773 B1 | * 9/2002 | Liang et al. | 379/1.04 |
| 6,594,344 B2 | * 7/2003 | Masri et al. | 379/27.01 |
| 6,614,763 B1 | * 9/2003 | Kikuchi et al. | 370/252 |
| 6,631,339 B2 | * 10/2003 | Poulsen et al. | |
| 6,643,266 B1 | * 11/2003 | Pugaczewski | 370/249 |

* cited by examiner

*Primary Examiner*—Ajit Patel
*Assistant Examiner*—Steven A Blount
(74) *Attorney, Agent, or Firm*—Neil Ormos; Steven R. Santema

(57) ABSTRACT

A communications quality measurement system for use with packet and other networks comprises a test signal transmitter, a test signal receiver, and a test signal analyzer. A test transmitter is used to produce a series of test signals selected or engineered for measuring one or more desired Quality of Service or other performance parameters of a network path to be tested. A first copy of the test signal is transmitted via a reference path of known characteristics and with minimal impairments. A second copy of the test signal is transmitted via the network path to be tested. A test receiver receives and records the signals which were carried via the reference and test paths. A test signal analyzer compares the signals received over the reference and test paths and analyzes differences to determine Quality of Service or other parameters, such as Bearer Delay, Cell or Packet Loss, Echo Delay, and Echo Amplitude, some of which are directed to the particular impairments that are characteristic of packet networks. The test signal is preferably injected into and received from handset analog audio paths of originating and terminating subscriber terminals, so that the effects of nearly all network components will be measured.

10 Claims, 5 Drawing Sheets

310 → $A_{MAX} = j$ WITH $\underset{j=1}{\overset{n}{MAX}}|r_j|$ = NUMBER OF SAMPLES SHIFTED TO YIELD MAX. "r"

312 → 0.125 mS. * A = DELAY

314 → $\bar{x} = \frac{1}{n}\sum_{i=1}^{n} x_i$

316 → $\bar{y} = \frac{1}{n}\sum_{i=1}^{n} y_i$

318 → $S_x^2 = \frac{1}{n-1}\sum_{i=1}^{n}(x_i-\bar{x})^2$

320 → $S_y^2 = \frac{1}{n-1}\sum_{i=1}^{n}(y_i-\bar{y})^2$

322 → $S_{xy} = \frac{1}{n-1}\sum_{i=1}^{n}(x_i-\bar{x})(y_i-\bar{y})$

324 → $r_j = \frac{S_{xy}}{S_x S_y}$  CORRELATION COEFFICIENT

*FIG. 3*

SYSTEM AND METHODS FOR MEASURING QUALITY OF COMMUNICATIONS OVER PACKET NETWORKS

CROSS REFERENCE TO RELATED APPLICATION

This application claims priority of Provisional Application Serial No. 60/155,317, filed Sep. 21, 1999.

FIELD OF THE INVENTION

This invention relates to telecommunications networks and more particularly to measuring quality of communications, including Quality of Service provided by a packet-based telecommunications network.

BACKGROUND OF THE INVENTION

Packet-based telecommunications networks are subject to a number of call path or transmission impairments. Some of these impairments differ from impairments found in circuit-based or circuit-switched networks, in that the impairments may be new to packet-based networks, or their manifestation in packet-based networks may have vastly differing characteristics. For example, in circuit networks, signal propagation delay throughout the call path is usually deterministic and remains constant once the call is set up. In packet networks, this delay is non-deterministic and may vary with congestion in or failures of various network components. In circuit networks, the loss of coded samples or other content is rare. In packet networks, packet loss may be frequent and may depend on network congestion and other factors. The quality of service perceived by the user depends in part on these and other impairments.

It is useful to measure these impairments in order to report on quality of service and to allow users, network providers, and others to determine quantitatively whether quality of service objectives are met and whether service-affecting trouble is present. Various tools have been available for measuring aspects of network performance. Packet network performance analyzers have been available, but their functions have been directed to measuring raw network performance, or network performance relating to data-carrying applications, and it is not known how to correlate such measurements to the performance or quality of the network in carrying voice or other media services.

Network performance analyzers are also available for circuit networks, and measure parameters such as loss, noise, delay, and distortion of various types. These analyzers may, for example, connect via analog or digital interfaces to individual lines, trunks, and/or carrier facilities, and may measure end-to-end or intermediate-point-to-intermediate point performance of network facilities, in either the analog or digital domains. Although these devices provide useful measures of performance of circuit networks, and although some may be adapted for use with digital networks, conventional network performance measurement systems of which the inventors are aware have not been suitable for providing useful measures of performance of digital packet networks, particularly with respect to the effects of certain impairments which may be unique to packet networks.

Further, packet networks generally require an analog-to-digital interface function, and may also require compression, encoding, and or encryption functions, to be performed in the subscriber terminal. However, this requirement is not unique to packet networks. Circuit network performance measurement tools of which the inventors are aware are adapted for connection to a line, a trunk, or a carrier facility, and therefore do not include in their measurements the performance of the subscriber terminal.

Thus, although some tools have been available for measuring aspects of network performance, it is believed that no tools have been available which are directed to measuring dimensions of performance directly relevant to the quality, of voice and, other telecommunications services provided over a packet network.

OBJECTS AND SUMMARY OF THE INVENTION

It is therefore an object of the present invention to provide a system and methods for measuring Quality of Service (QoS) or other performance of communications services provided in packet-based networks that minimize the disadvantages of the prior art.

A preferred embodiment of a communications quality measurement system constructed according to the present invention comprises a test signal transmitter, a test signal receiver, and a test signal analyzer coupled to the test signal transmitter and the test signal receiver. Preferably, the communications quality measurement system further comprises a transmitting tap or interface connected to the test signal generator for coupling the test signal generator to a network being tested, and a receiving tap or interface connected to the test signal receiver for coupling the test signal receiver to the network.

The test signal generator preferably has facilities for controllably generating arbitrary signals on at least two "analog" signal channels in the frequency range to be tested. For networks carrying telephone-quality voice signals, this range is typically 300–3400 Hz. The test signal receiver preferably has facilities for receiving at least two "analog" signal channels in the frequency range to be tested and for converting the signals into a form useable by the test signal analyzer.

In a preferred embodiment, the test signal generator, the test signal receiver, and the test signal analyzer may be implemented using a general purpose programmable computer, such as an industry-standard personal computer, including appropriate audio-frequency (AF) analog-to-digital (A-D) and digital to analog (D-A) signal conversion equipment. As of the time of filing of this application, suitable signal conversion equipment, sometimes referred to as a "sound card", is readily available for personal computers as an add-on card or as an integrated portion of the computer's main circuit board.

The transmitting and receiving taps or interfaces couple the test signal between the communications quality measurement system and the network. The communications quality measurement system may be coupled, for example, to conventional analog lines or trunks using known interface circuits. In applications where the communications quality measurement system is to be used with a digital packet network, it may be advantageous to include in quality measurements the performance of the user terminals, including any elements thereof responsible for converting content carried via the digital packet media to human-useable form. In that case, the transmitting and receiving taps are preferably suitably connected to signal leads of the user terminal carrying the content in analog form, and may be optimally connected in leads carrying the signals from the terminal microphone and to the terminal speaker. For example, if the user terminal has a conventional telephone receiver, the transmitting and receiving taps may simply be resistive voltage dividers connected to the microphone and speaker leads of the receiver.

In operation, a test signal connection is made through the network path under test between a first channel of the test signal generator and a corresponding first channel of the test signal receiver. A reference signal connection is made through a known-good or reference path between a second channel of the test signal generator and a corresponding second channel of the test signal receiver. The reference signal connection may be as simple as a jumper cable between the transmitter reference channel port and the receiver reference channel port.

The test signal generator produces an appropriate test signal selected to measure aspects of the network path under test and transmits that signal on both the test channel and the reference channel. By way of example, appropriate test signals may include, in various combinations and sequences, periods of silence, band-limited white noise, impulse or step-function signals, and continuous, interrupted, or pulsed tones at various frequencies. The test signal receiver receives the test signal and the reference signal and passes a converted version of the signals to the test signal analyzer. The test signal analyzer compares the received test add reference signals to measure and report Quality of Service or other performance aspects of the network under test.

BRIEF DESCRIPTION OF THE DRAWINGS

These and other features of the invention will be best understood by reference to the following detailed description of a preferred embodiment of the invention, taken in conjunction with the accompanying drawings, in which:

FIG. 3 shows a sequence of calculations used to determine cross correlation of a received test signal and a received reference signal, for use in conjunction with the communications quality measurement system 100 of FIG. 1;

DETAILED DESCRIPTION OF THE PREFERRED EMBODIMENTS

Figure 1:
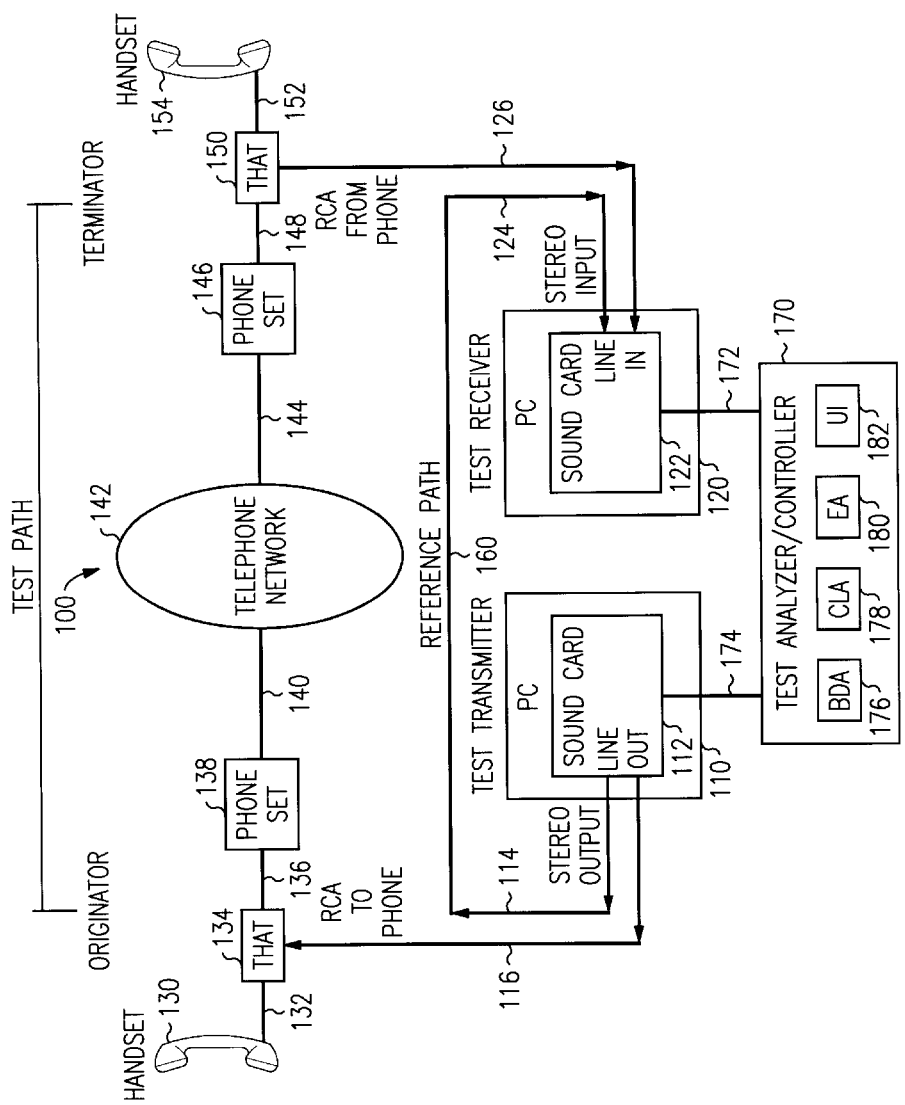
FIG. 1 is a block diagram showing a communications quality measurement system 100 constructed according to an aspect of the present invention.

According to the present invention, there is provided a system and methods for measuring Quality of Service (QoS) of communications services provided in packet based and other networks. FIG. 1 is a block diagram showing a preferred embodiment 100 of a QoS testing system constructed according to an aspect of the present invention.

The present application relates to telecommunications systems. It will be appreciated that in the telecommunications arts, various signal leads, busses, data paths, data structures, channels, buffers, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

The term "circuit" as applied to a network or network path refers to a mode of information transfer which occurs between defined endpoints over reserved network resources, and in which units of data are not individually addressed. Once a path or route is established for a circuit path, no further routing or addressing is required. The term "packet" as applied to a path or network refers to a mode of information transfer in which a stream of information is divided into packets or units, and in which each packet or unit is individually addressed. A packet path does not necessarily reserve network resources. It is recognized that some components carrying a circuit path may be implemented using packet- or cell-based technologies. It is believed that the particular features of the present invention directed to measuring quality and other performance aspects of packet networks and paths thereof may be applicable not only to networks exhibiting the external interface of a packet network, but also to networks exhibiting the external infrace of a circuit network but which happen to include transmission, switching, or other elements which employ packet- or cell-based technologies.

In summary, a test transmitter 110 is used to produce a series of test signals selected or engineered for measuring one or more desired QoS or other performance parameters of a network path to be tested. A test receiver 120 is used to receive the test signals. Preferably, the test receiver 120 receives a first "reference" signal on leads 114, 124 directly from the test transmitter 110. The test receiver 120 receives on lead 126 a second signal which is routed from the test transmitter 110 through the network path to be tested, and which is subject to whatever impairments may afflict a call path through the network. By way of example but not limitation, the network path to be tested may include a telecommunications network 142, such as a public or private telephone network, and interconnections 140, 144 thereto, including any packet-based components thereof. The test receiver 120 receives the "reference signal", carried through a path of known characteristics (and preferably of minimal impairments), and the "test signal", carried through the network call path under test.

A test analyzer/controller 170 controls the operation of test transmitter 110 and test receiver 120, and compares the reference signal and the test signal to measure various impairment characteristics, including, for example: signal delay (which may include packet delay and delays from other causes); packet loss; echo amplitude; and echo path round-trip delay. Although elements 110, 120, and 170 are described herein and shown in FIG. 1 as separate units, it will be appreciated that in some embodiments, the functions of these elements may actually be implemented using elements and components in common. Thus, as implemented in practice, a single component or element may perform selected functions of the test analyzer/controller 170, the test transmitter 110, and the test receiver 120, and multiple components, elements, and functions may be integrated into a single unit. Also, where it is desirable to have large physical separation between the test transmitter 110 and the test receiver 120, these components may be separately controlled and may have no connections therebetween other than the reference and test paths.

As best seen in FIG. 1, the test transmitter 110 may be implemented using an suitable programmable computer, such as an industry-standard personal computer, including suitable digital-to-analog signal conversion facilities 112. The digital-to-analog conversion facilities 112 may be implemented using a conventional computer sound card. As is known in the art, a personal computer sound card incorporates digital-to-analog and analog-to-digital conversion facilities which may be operated under control of the computer. The computer is preferably adapted to emit appropriate test patterns or test signals using the sound card. Preferably, a sound card having at least two output channels (sometimes referred to as stereophonic output) is provided in the test transmitter computer although a single-channel sound card could be used for some tests. For embodiments intended to test telephone quality network paths, the sound card preferably has digital-to-analog converter resolution of at least 16 bits and bandwidth of at least 10 KHz. However, sound cards of lower resolution and smaller bandwidths could be adequate for some measurement applications. As of the time of filing of this application, suitable "sound cards" or equivalent conversion facilities are readily available for personal computers as add-on cards or as an integrated portion of a computer's main circuit board. Other network paths may provide different bandwidths and digital conversion quality, and embodiments intended to test such paths may require different sound card capabilities or may require laboratory- or industrial-grade A-D and D-A conversion equipment. Although the test transmitter is preferably implemented using a computer-based device for producing a test signal, any other suitable audio-frequency playback device could also be used, including, for example, a tape player or CD player.

The test receiver 120 may be implemented using a suitable programmable computer, such as an industry-standard personal computer, including suitable analog-to-digital signal conversion facilities 122. The analog-to-digital converstion facilities 122 may be implemented using a conventional sound card. The computer is preferably programmed to receive and record the test patterns or test signals sent by the test transmitter. Preferably, at least a two-channel or sterophonic sound card is provided in the test receiver computer to enable it to receive both a the reference signal from the test transmitter and a test signal routed through the telecommunications network path to be tested. The sound card preferably has digital-to-analog converter resolution of at least 16 bits and bandwidth of at least 10 KHz (i.e., sampling rate of at least 20 KHz).

The test analyzer/controller 170 is preferably adapted to measure QoS or other performance parameters based an the received signals and to display, and record the analyzed results. The functions of the test analyzer/controller 170 may be implemented as a part of the test receiver 120. As an alternative, the test receiver 120 may be assigned to merely record the received test signals, and the functions of the test analyzer/controller 170 may be implemented by a separate computer to analyze the received signals to measure and display the QoS and other performance parameters. The computer or computers used to implement test transmitter 110, test receiver 120, and test analyzer/controller 170 may, for example, be an industry standard personal computer having an INTEL PENTIUM or compatible central processing unit, 64 megabytes of main memory, and suitable other peripherals, operating system software, and other software. Other computers could also be used.

A network path to be tested may take several forms, in that there may be several locations at which a test signal may be injected and received, including at the subscriber terminal, at the subscriber local loop (which may be implemented, e.g., as a conventional analog line, a digital subscriber line, a packet network access connection, etc.), and at a network trunk (which may be implemented, e.g., as a conventional analog trunk, a TDM channel of a carrier facility, or as a connection over a packet- or cell-based medium). A network path to be tested including the originating and terminating subscriber terminals 138 and 146 will now be described, and has the advantage of including in the test all of the components which would be involved in a call except for the originating mouthpiece transducer (i.e., the originating microphone) and the terminating earpiece transducer (i.e., the terminating speaker). However, one of skill in the art will appreciate that test signals may be injected and received at other locations in the path, and will understand how to employ conventional line, trunk, or carrier facility interface equipment or circuits as required. An exemplary path for a voice call through a network includes a first handset 130, a first telephone station set 138, leads 132, normally connecting the first handset 130 to the first telephone station set 138, a first transmission facility 140 between the first station set 138 and a telephone network 142, the telephone network itself 142, a second telephone station set 146 and transmission facility 144 connecting it to the telephone network 142, a second handset 154, and leads 148, 152 normally connecting the second telephone station set 146 to handset 154. This is the path a normal voice call or similar traffic would take between a first handset 130 and a second handset 154.

In order to test a network-routed call path, the test transmitter 110 produces test signals on lead 116 and supplies them to a telephone handset audio tap (THAT) device 134 which is interposed in leads 132, 136. The THAT device 134 allows signals to be controllably injected into or received from the handset circuit. Any other suitable audio tap device or device for providing an audio connection to a telephone line or circuit could also be used. It will be appreciated that ordinarily, leads 132, 134 carry analog signals. By injecting test signals at this peripheral point in a network, the test signals advantageously will include the effects of the station set 138, the telephone network 142, and the station set 146, as well as any transmission facilities, gateways, switches, routers, and the like associated therewith. Station sets 138, 146 may be any POTS or ISDN telephone station sets, a packet capable subscriber terminal such as a personal computer, or any other suitable station sets. Signals received at the second THAT 150 (connected to the second station set 146) are provided to an input of the sound card 122 of test receiver 120.

In operation, a call is first made from first station set 138 to second station set 146. The test transmitter 110 transmits a stereo test signal with identical information on its left and right channel outputs 114 and 116, respectively. A first (reference) channel output 114 is transmitted along a reference path 160 having known characteristics, and preferably, minimal or no impairments characteristic of a path through a telecommunications network. For example, the reference path may directly loop back to the first (reference) channel input 124 of the test receiver 120, and may be implemented as a jumper cable between output channel 114 and input channel 124. A second (test) channel output 116 is supplied to THAT 134. The test signal from the test channel output 116 traverses through first telephone station set 138, the telephone network 142 (including any packet-oriented elements thereof), and second telephone station set 146 to the second THAT 150. The received test signal is provided to the second (test) input 126 of the test receiver 120. The test receiver receives and digitizes the signals from both the test and reference channels. Preferably, a recording component of test receiver 120, such as a sound file editor, stores the signals into a standard sound file (.wav), which is a format in which signals are stored as linearly pulse-code-modulation-encoded samples. Any other suitable sample collection/recording facilities and sample record formats could also be used. The stored samples may then be analyzed to measure and report QoS and other performance parameters. The test signal may be transmitted for a period of a few minutes to many hours to characterize the QoS of a network or network path as conditions vary.

Test analyzer/controller 170 has optional connections 172 and 174 to test receiver 120 and test transmitter 110 to select and control appropriate tests and to receive test samples recorded by test receiver 120. The test analyzer/controller 170 preferably includes a suitable user interface component 182 to perform interactions with the user, including displaying test results. The functions of the test analyzer/controller 170, including user interface 182, may be implemented in a separate component, or may be distributed among test transmitter 110 and test receiver 120.

For each QoS parameter, a particular test signal is used, and a corresponding one of several analysis tools, e.g., 176, 178, and 180, is preferably used to analyze the received signals to provide useful information.

Figure 2:
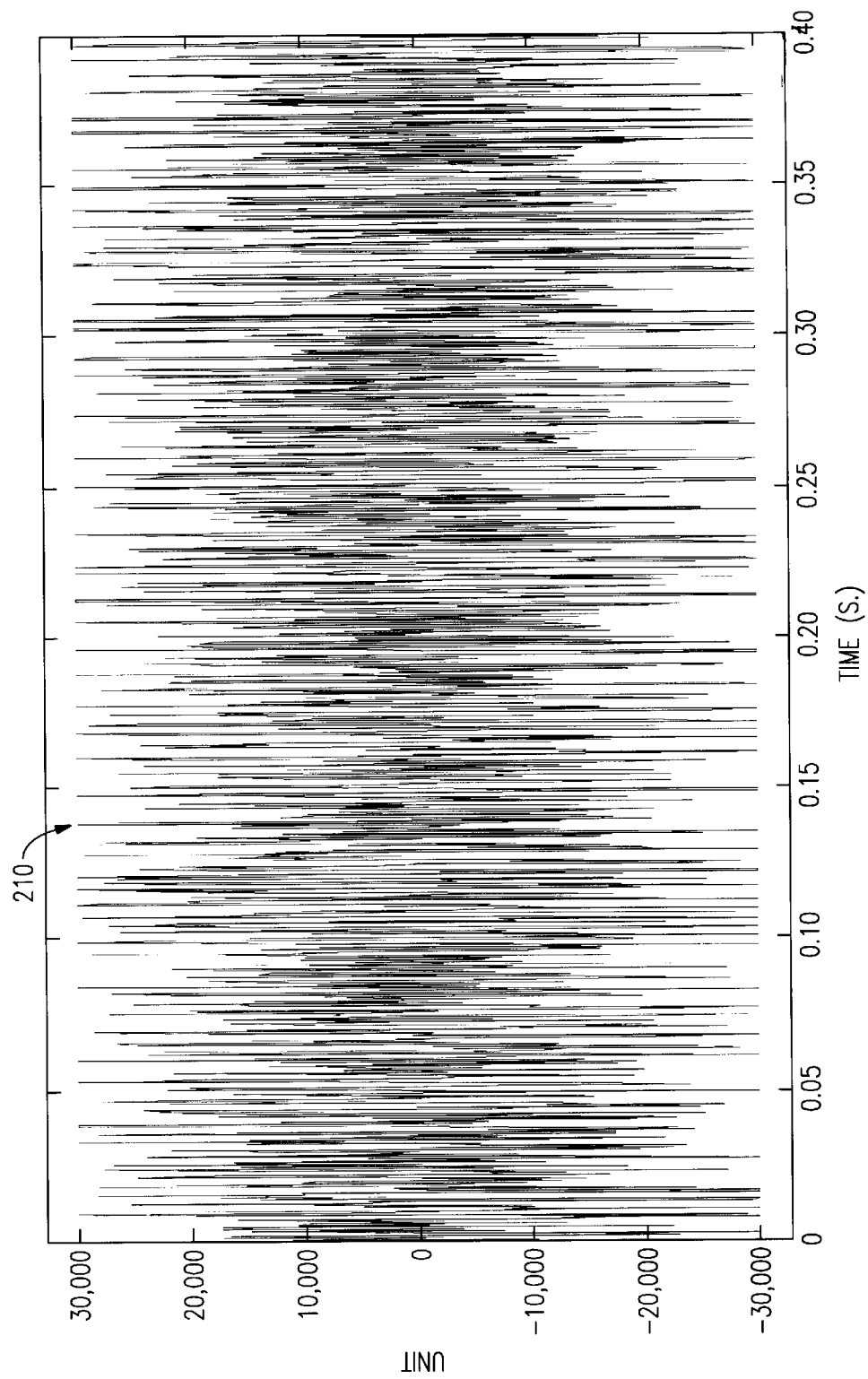
FIG. 2 is a plot of a band-limited white-noise signal, shown as a first example of one of the test signals which may be used in conjunction with the communications quality measurement system 100 of FIG. 1.

According to an aspect of the present invention, in order to measure Bearer Delay or propagation delay of a signal through the network, the test signal is preferably a flat-spectrum "white noise" signal, throughout the normal voice band (e.g. 300–3400 Hz). A suitable test signal 210 is depicted graphically in FIG. 2. However, one of skill in the art will appreciate how to generate an appropriate test signal.

Preferably, a Bearer Delay Analysis tool 176 is provided for post-processing the received data to determine the end-to-end delay of the call. End-to-end delay includes packet network delay and, in addition, any delay imposed by circuit network elements which must be traversed, for example, to reach the packet network. Network delay may be equivalent or close to the packet delay in a packetized network. The term "post-processing" does not necessarily mean processing in batch; rather, received test signals may be analyzed in near-real-time to produce, from a user's perspective, a contemporaneous measure of signal propagation delay. The tool reads the sample record file (which may be in .wav format), strips the file header and computes the elapsed time of the test signals on the left and right channels using known cross-correlation calculation techniques.

The BDA tool 176 searches to determine the delay by shifting the data of one of the channels one sample at a time and determining the correlation between the channels. The relative shift between the channels when the correlation is maximized indicates the delay. Because the reference channel is subject to essentially zero delay (in that the conversion equipment for both the test channel and the reference channel introduce the same small fixed delay, which delay is "cancelled out" in calculating the relative delay between the two channels), the elapsed time can be attributed to the end-to-end delay of the call. Because each THAT device is connected to a telephone station set, the measured delay includes that introduced by components in the telephone station sets, any remote terminals (if the phone connects to a subscriber's loop carrier system), any end offices and any Packet Gateway Switches.

FIG. 3 shows a sequence of calculations used to determine cross correlation of a received test signal and a received reference signal, which is used to determine bearer delay. A first set of n adjacent samples $X(1)$–$X(n)$ is selected from the received reference signal. Each sample differs in time from its neighbor by a sample interval, which for conventional PCM-encoded telephony, is typically 0.125 mS. However, other sample intervals could also be used. The measurement of bearer delay is performed by: (1) selecting a period of the received reference signal; (2) finding the period of the received test signal that most closely matches the selected period of the reference signal by repetitively shifting one of the signals a sample at a time and calculating the correlation coefficient each time, to find the total shift resulting in the maximum correlation; and (3) calculating as the delay the time difference (total shift multiplied by sample interval) between reception of the selected reference signal period and the matched test signal period.

Consider Equation 310. For each possible shift value of j from 1 to n, a second set of n adjacent samples $Y(1)$–$Y(n)$ is selected from the received test signal at a location offset by j samples from the beginning of the received reference sample. For each shift value j, the value of the correlation coefficient $r(j)$ calculated over the reference sample period and the shifted test sample period is determined, and the shift value $A(max)$ resulting in the maximum correlation coefficient is selected. Consider Equation 312. Delay is calculated as $A(max)$ multiplied by the sample interval, such as 0.125 mS. Equations 314–324 are used in calculating the correlation coefficient. First, equation 314 calculates $X(mean)$ as the arithmetic mean of the samples in the selected reference signal period. Equation 316 calculates $Y(mean)$ as the arithmetic mean of the samples in the selected (shifted) test signal period. Equations 318, 320 and 322 are used to calculate the variance and covariance of samples X and Y. Finally, equation 324 is used to calculate correlation coefficient.

To further determine the network packet delay, it is possible to measure the delay of a circuit-switched connection by making a call which is not routed through packetized portions of the telephone network, for example, by making a call that by-passes the Packet Gateway Switch. The difference in delays between these two network connection scenarios is the bearer delay in the packetized portion of the call (including, for example, the packet voice gateway (PVG) and any asynchronous transfer mode (ATM) or other packet or cell switches).

Figure 4:
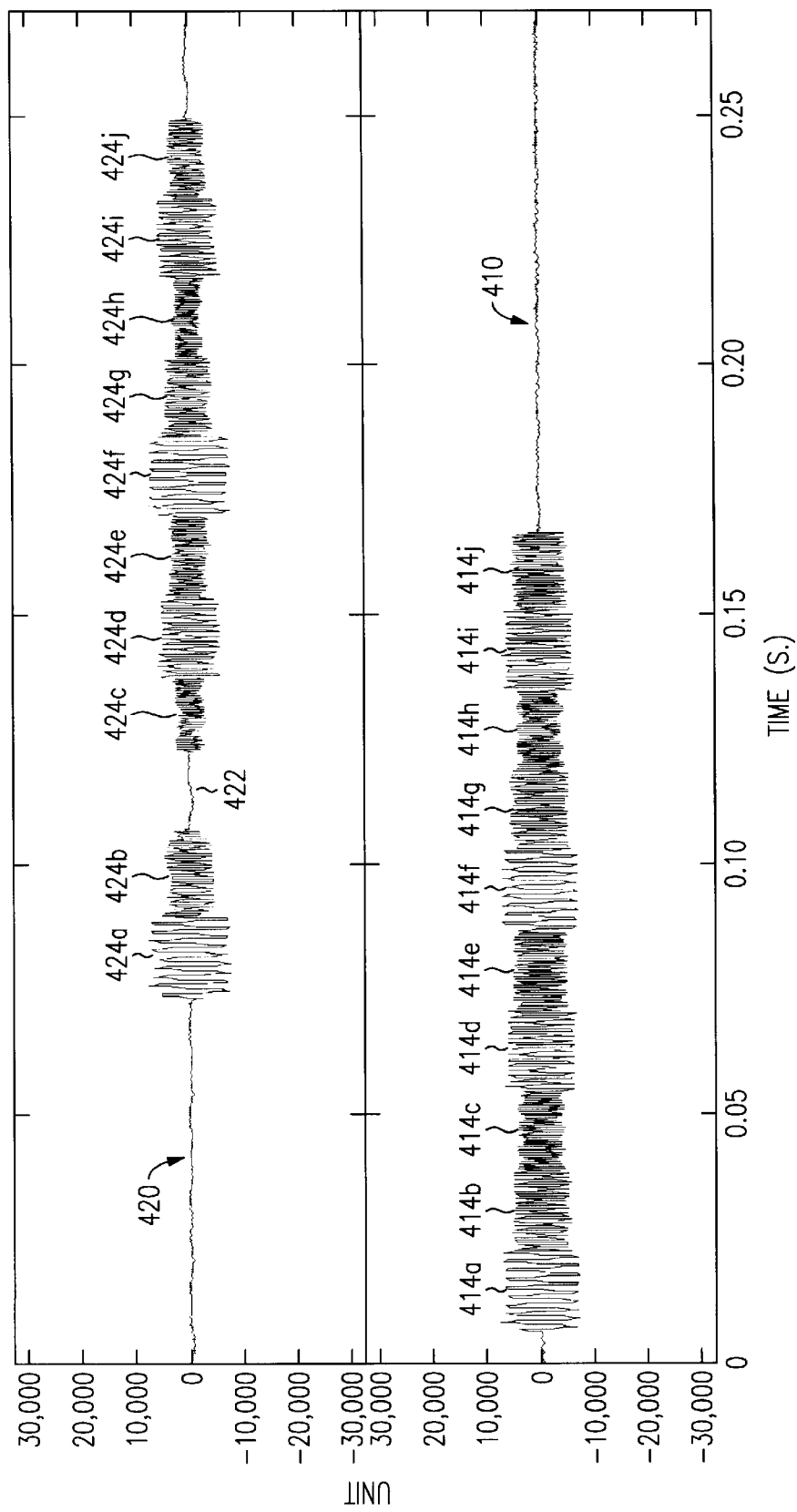
FIG. 4 is a plot comparing, for a period of a second exemplary test signal transmitted by the communications quality measurement system 100 of FIG. 1, the received versions of the signal having passed through a network path under test and a reference path, in which the received network-path test signal has suffered impairments due to the network path.

According to a further aspect of the invention, in order to measure a packet or cell loss QoS parameter, a test signal having a repeating pattern of known frequencies, amplitudes, and/or other characteristics may be transmitted. A suitable such signal is shown in FIG. 4, in which trace 410, including elements 414a, 414b, 414c, 414d, 414e, 414f, 414g, 414h, 414i, and 414j, represents the received reference-path signal, which is equivalent to the transmitted signal, and trace 420, including elements 424a, 424b, 424c, 424d, 424e, 424f, 424g, 424h, 424i, and 424j, represents the received test-path signal. Preferably, each distinct element of the transmitted signal may correspond in length to that which can be transmitted by the network in one packet or cell, although other arrangements could also be used. The received test-path signal is delayed, as indicated by horizontal displacement with respect to like features of the reference-path signal. Ideally, the received test-path signal would be identical to the received reference-path signal except for delay. However, occasionally packets are dropped or misrouted and do not arrive at the receiver at all or arrive too late to be used. In that case, the Packet Gateway Switch or other network elements may provide fill information to correspond to the dropped packet. The fill information is unlikely to be identical to the contents of the dropped packet. For example, one element of the transmitted test signal, designated as 414c on the received reference-path trace 410 of FIG. 4, was delayed. Network components in the test path inserted fill information, designated as 422 on the received test-path trace 420 of FIG. 4. This can be detected by analysis tools because the fill information 422 does not correspond to the characteristics of any of the known test signal components. Except for the fill information 422, each of the elements 424a, 424b, 424c, 424d, 424e, 424f, 424g, 424h, 424i, and 424j shown on the received test-path trace is similar in characteristics to a respective one of the elements 414a, 414b, 414c, 414d, 414e, 414f, 414g, 414h, 414i, and 414j shown on the reference-path trace.

Preferably, a Cell or Packet Loss Analysis tool 178 analyzes the received signal and detects lost cells or packets. One way of detecting lost cells or packets is by comparing the signal amplitude of a plurality of consecutive samples (e.g. 47 samples) against a pre-determined threshold. Known test signal components have significant amplitude, so a large number of low-amplitude components indicates a dropped packet or cell. Another way of detecting lost cells or packets is by using the aforementioned cross-correlation techniques (see FIG. 3 and associated text) to determine if an interval of received signal matches the characteristics of any of the several known test signal components. If none are matched, the interval must correspond to a dropped packet or cell.

Figure 5:
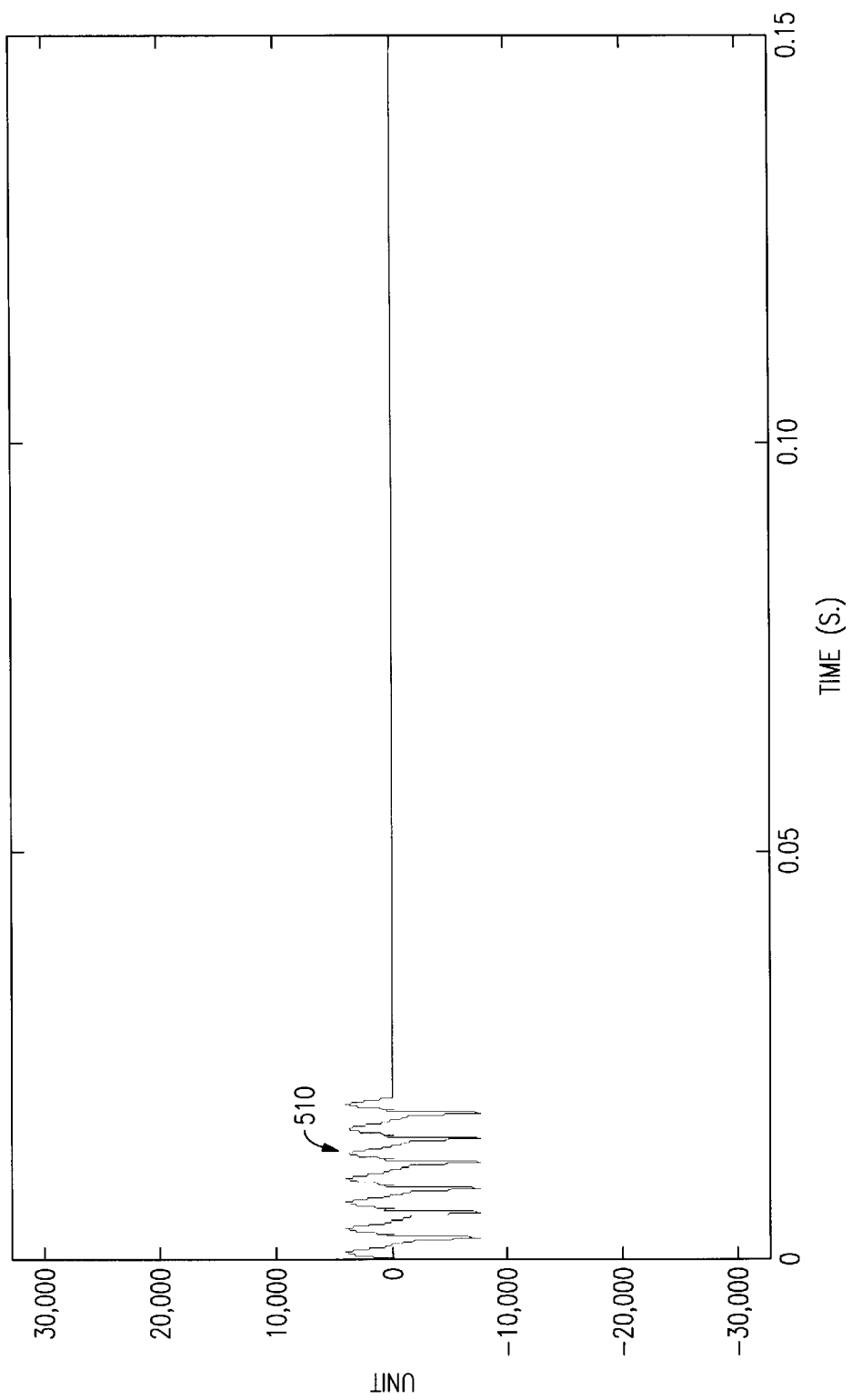
FIG. 5 is a plot showing a period of a cyclical, but non-symmetric and non-sinusoidal test signal, shown as a third example of one of the test signals which may be used in conjunction with the communications quality measurement system 100 of FIG. 1.

According to a further aspect of the invention, in order to measure network echo characteristics, including echo path loss and round-trip echo delay, a test signal may be constructed as a short burst of an artificially generated pseudo-noise signal having characteristics similar to a voice signal. The burst may last, for example, for 5 to 20 mS. A suitable echo test signal 510 is shown in FIG. 5.

Preferably, an Echo Analysis tool 180 analyzes the received signal and measures QoS parameters relating to echo, including echo path loss and round-trip echo path delay. Echo delay may be measured by measuring the elapsed time required for the echo return signal. The echo return signal may be recorded by test receiver 120 as hereinbefore described. However, the echo return signal is preferably obtained at the originating subscriber terminal or telephone handset 138 using the originating THAT 134. For delay measurement purposes, the return signal may be detected simply by examining the received signal to determine when a signal of significant amplitude has arrived. Alternately, the correlation techniques described above and shown in FIG. 3 could also be used. These methods are useful for measuring delays which are at least a large fraction of the burst length. For shorter delays, shorter burst lengths must be used.

In order to measure echo path loss, it is necessary to calibrate the return signal measurement by also measuring the transmitted signal power using the same terminal. A conversion factor between an actual analog measurement of the power of the transmitted signal (expressed in dBm) and a power measurement of the same signal digitally encoded as linear PCM samples (expressed in dBOV) may thus be obtained. Then, an actual value (in dBm) of the power of the return echo signal may be obtained by applying the conversion factor to the measured value (in dBOV) of the digitally-encoded return echo signal. Signal measurements expressed in dBOV are referenced to the maximum digitally encodable value of the encoding system, which ordinarily corresponds to an encoded value of all ones.

The present application relates to telecommunications systems, including multimedia telecommunications systems, which may be implemented using a variety of electronic and optical technologies, including but not limited to: analog electronic systems; digital electronic systems; microprocessors and other processing elements; and software and other embodied collections of steps, instructions, and the like, for implementing methods, processes, or policies in conjunction with such systems and processing elements. The embodiments described herein are exemplary. Thus it will be appreciated that although the embodiments are described in terms of specific technologies, other equivalent technologies could be used to implement systems in keeping with the spirit of the present invention.

Thus, a communications quality measurement system has been disclosed which includes a test signal generator, a test signal receiver, and a test signal analyzer. A test transmitter is used to produce a series of test signals selected or engineered for measuring one or more desired Quality of Service or other performance parameters of a network path to be tested. A first copy of the test signal is transmitted via a reference path of known characteristics and with minimal impairments. A second copy of the test signal is transmitted via the network path to be tested. A test receiver receives and records the signals which were carried via the reference and test paths. A test signal analyzer compares the signals received over the reference and test paths and analyzes differences to determine Quality of Service or other parameters, such as Bearer Delay, Cell or Packet Loss, Echo Delay, and Echo Amplitude, some of which are advantageously directed to the particular impairments that are characteristic of packet networks. The test signal is preferably injected into and received from handset analog audio paths of originating and terminating subscriber terminals, so that, advantageously, the effects of nearly all network components will be measured.

The above-described embodiment of the invention is merely one example of a way in which the invention may be carried out. Other ways may also be possible and are within the scope of the invention.

What is claimed is:

1. A system for measuring channel impairments associated with a communications path comprising:

a test signal transmitter, said test signal transmitter being-adapted to transmit first and second channel outputs over first and second paths, one of said first and second paths defining a reference path having known impairment characteristics, the first channel output being transmitted over the reference path and yielding a reference signal, the other of said first and second paths defining a test path for which impairment characteristics are to be measured, the test path including at least a first and second phone set interconnected by a telephone network, the second channel output being transmitted over the test path and yielding a test signal;

a test signal receiver, said test signal receiver being adapted to receive said reference signal and said test signal from said first and second paths; and a test signal analyzer coupled to the test signal transmitter and the test signal receiver, said test signal analyzer being adapted to analyze said reference signal and said test signal and to responsively determine one or more impairment characteristics of said test path based on said comparison of said reference signal and said test signal.

2. The system of claim 1, further comprising an audio tap adapted to couple said test signal from said test signal transmitter to an audio circuit of said first phone set.

3. The system of claim 1, further comprising an audio tap adapted to couple said test signal from an audio circuit of said second phone set to said test signal receiver.

4. The system of claim 1 wherein said test signal generator comprises a digital-to-analog converter.

5. The system of claim 1 wherein said test signal generator comprises an audio play device.

6. The system of claim 5 wherein said reference path is a jumper coupling a port of said test signal transmitter to a port of said test signal receiver.

7. The system of claim 1 wherein said test signal analyzer includes a bearer delay analyzer adapted to measure bearer delay of said test path.

8. The system of claim 1 wherein said test signal analyzer includes a cell or packet loss analyzer adapted to measure cell or packet loss of said test path.

9. The system of claim 1 wherein said test signal analyzer includes an echo analyzer adapted to measure echo delay of said test path.

10. The system of claim 1 wherein said test signal analyzer includes an echo analyzer adapted to measure echo amplitude of said test path.

* * * * *